(12) United States Patent
Yaron et al.

(10) Patent No.: US 6,496,189 B1
(45) Date of Patent: Dec. 17, 2002

(54) REMOTE LANDSCAPE DISPLAY AND PILOT TRAINING

(75) Inventors: Ronnie Yaron, Kadima; Ofer Shor, Tel Aviv, both of (IL)

(73) Assignee: Skyline Software Systems Ltd., Givat Shmuel (IL)

( * ) Notice: Subject to any disclaimer, the term of this patent is extended or adjusted under 35 U.S.C. 154(b) by 0 days.

(21) Appl. No.: 09/258,663

(22) Filed: Feb. 26, 1999

Related U.S. Application Data

(63) Continuation-in-part of application No. 08/939,948, filed on Sep. 29, 1997, now Pat. No. 6,111,583.

(51) Int. Cl.[7] .............................................. G06T 17/00
(52) U.S. Cl. ...................... 345/428; 345/582; 345/419
(58) Field of Search ............................... 345/419, 582, 345/428; 342/36, 44, 357.01, 456; 701/207

(56) References Cited

U.S. PATENT DOCUMENTS

| | | | | |
|---|---|---|---|---|
| 4,070,705 A | * | 1/1978 | Lockwood et al. | 364/200 |
| 4,359,733 A | * | 11/1982 | O'Neill | 342/36 |
| 4,940,972 A | | 7/1990 | Mouchot et al. | 340/747 |
| 5,550,959 A | | 8/1996 | Freeman | 395/127 |
| 5,566,073 A | | 10/1996 | Margolin | 364/449 |
| 5,652,863 A | * | 7/1997 | Asenio et al. | 395/497.04 |
| 5,760,783 A | * | 6/1998 | Migdal et al. | 345/430 |
| 5,798,713 A | * | 8/1998 | Viebahn et al. | 340/974 |
| 5,886,702 A | * | 3/1999 | Migdal et al. | 345/423 |
| 6,111,568 A | * | 8/2000 | Reber et al. | 345/327 |

OTHER PUBLICATIONS

"ZBuffer," Caroline Jelinek, Mar. 24, 1996—Materials collected from the World Wide Web—Addressed http://www.cs.unc.edu/~bryan/bsg/TechMan/zbuffer.html.
"1.1 Photo–realistic Image Synthesis," Gary Shea, May 27, 1995—Materials collected from the World Wide Web—Addressed: http://www.xmission.com/~shea/thl/node5.html#Section0041.

* cited by examiner

*Primary Examiner*—Mark Zimmerman
*Assistant Examiner*—Lance W. Sealey
(74) *Attorney, Agent, or Firm*—Duane Morris LLP

(57) ABSTRACT

A method of providing data blocks describing three-dimensional terrain to a renderer. The data blocks belong to a hierarchical structure which includes blocks at a plurality of different resolution levels. The method includes receiving from the renderer one or more coordinates in the terrain along with indication of a respective resolution level, providing the renderer with a first data block which includes data corresponding to the one or more coordinates, from a local memory, and downloading from a remote server one or more additional data blocks which include data corresponding to the one or more coordinates if the provided block from the local memory is not at the indicated resolution level.

24 Claims, 9 Drawing Sheets

REMOTE LANDSCAPE DISPLAY AND PILOT TRAINING

CROSS-REFERENCE TO RELATED CASE

This is a continuation-in-part of U.S. patent application Ser. No. 08/939,948, filed on Sep. 29, 1997 now U.S. Pat. No. 6,111,583.

FIELD OF THE INVENTION

The present invention relates generally to terrain displays, and specifically to computerized displaying of real-life three-dimensional images of terrain.

BACKGROUND OF THE INVENTION

Pilots frequently wish to plan their flight route ahead of time and familiarize themselves with the points they plan to pass and approach. Maps and flight charts are used to plan routes before actually flying. However, not all pilots can easily appreciate all the features and difficulties of a route from a map. Furthermore, some information may not appear on the map in sufficient detail. For this reason, Jeppesen Sanderson Inc., of Englewood, Colorado, provides pilots with actual photographs of runway environments together with graphical presentations of terrain and other obstacles, as well as other pertinent local traffic information.

Flight simulators allow pilots to practice flying without leaving the ground. The simulator shows the view seen by the pilot at every point of the flight. However, most existing simulators do not show real images, but rather animated views, and they cannot provide full acquaintance with real-life terrain.

In addition, there exist Internet sites which display still images and/or video streams of different locations, for those who wish to see the location before visiting there. Although streaming of video images over the Internet is known in the art, Internet video streams are limited in the information they provide and would not allow the pilot to interactively probe the terrain over which he is going to fly.

Computer rendering of three-dimensional terrain images is known in the art. U.S. Pat. No. 4,940,972, which is incorporated herein by reference, suggests displaying to a pilot of an aircraft a synthetic image of the ground terrain over which the pilot is flying. U.S. Pat. No. 5,566,073 which is incorporated herein by reference, describes a method for allowing a pilot to preview a route either in flight or on the ground. The '073 patent also suggests allowing the pilot to take over and try out different flight strategies. However, the data volume required to display flight routes in accordance with the above-mentioned patents is very large. The '073 patent suggests representing the terrain as polygons in order to save computer storage space, but even so, the amount of storage on most home computers allows only a limited area and/or resolution level to be displayed. The '073 patent suggests using a CD-ROM to store the required data. However, the delivery of the CD-ROM to home users requires time and prevents pilots from preparing for last minute flight scheduling. Furthermore, changes in the terrain, such as seasonal changes, require frequent updates of the data on the CD-ROM.

SUMMARY OF THE INVENTION

It is an object of some aspects of the present invention to provide methods and apparatus for displaying on a remote computer actual images of an area as seen from a viewpoint which is chosen interactively.

It is another object of some aspects of the present invention to provide methods and apparatus for training a pilot to fly a preplanned flight course while allowing the pilot to see the view seen at any point along the flight course at substantially any desired angle.

It is still another object of some aspects of the present invention to provide methods and apparatus for displaying on a client computer images of ground terrain stored in a remote server, which are conveyed to the client via a network, preferably the Internet.

It is still another object of some aspects of the present invention to provide methods and apparatus for streaming data required for rendering three-dimensional terrain images on a remote computer.

In preferred embodiments of the present invention, a processor simulates flight of a virtual airplane along a selected route. At substantially any viewpoint along the route, the processor displays the view seen from the viewpoint in three-dimensional real-life images. A user may select at substantially each point along the route the direction of view and may change the direction dynamically.

Preferably, the user controls the speed of progress along the route and may stop the progress and/or reverse direction along the course.

Preferably, the user views the three-dimensional images without having to store a large database of terrain images on the user's processor, and without requiring that the processor have an unusually large memory capacity. Rather, the user connects to a pilot training server, which stores all the required data, and the user's processor downloads the data dynamically according to the data required to display each specific scene. Preferably, the processor connects to the server via a communication link, preferably a public network, such as the Internet. Preferably, the data is conveyed by a standard modem at sufficient speed for relatively smooth display of the images.

Alternatively or additionally, the required data is downloaded prior to the displaying of the scene, or the data is retrieved from a CD or other memory apparatus associated with the processor.

In some preferred embodiments of the present invention, the user may change the parameters of the movement of the virtual airplane, including the speed, height and angle of the airplane, and even deviate from the preplanned route.

In some preferred embodiments of the present invention, the route includes access to an airport according to the access rules of the airport. Alternatively or additionally, the route may include military maneuvers for bombing or access to enemy locations. Further alternatively or additionally, the route may be selected from routes of access to canyons, mountain areas or any other hard-to-access points, for example, in order to train rescue helicopter pilots.

In some preferred embodiments of the present invention, an operator of the server and/or the user may add to the data which describes the terrain annotations which describe specific points in the scene, such as runways or other destinations. Alternatively or additionally, the operator may add three-dimensional objects, such as planned buildings, vehicles, etc. In a preferred embodiment of the present invention, a group of vehicles are tracked according to their position, and they are constantly superimposed on the landscape images.

U.S. patent application Ser. No. 08/939,948, which is assigned to the assignee of the present application and is incorporated herein by reference, describes a method of rendering three-dimensional terrain images. The method allows fast rendering of images by comparison with other methods known in the art. The method of U.S. patent application Ser. No. 08/939,948 uses a hierarchical database in which substantially each terrain area is described in a plurality of blocks at different resolution levels. The blocks at lower resolution levels include less detail per unit area, while the blocks of higher resolution levels include more detail per unit area. The additional storage space required in order to store the additional data required due to the hierarchical structure is "paid back" in improved time performance of the rendering.

In some preferred embodiments of the present invention, the data is stored at the remote server in accordance with the hierarchical structure described in the '948 application. When data describing a specific area is needed in order to render the current view, the processor first downloads a block with a low level of resolution, which requires less data volume per area unit, and renders the view using the lower resolution block. Afterwards, if available bandwidth on the communication line permits, blocks which cover the specific area from higher resolution levels are downloaded, and the processor uses these blocks to improve the rendered view.

In some preferred embodiments of the present invention, the processor manages a local cache memory in which the processor stores blocks which cover terrain areas in the vicinity of the current viewpoint. Preferably, the processor stores in the cache memory all blocks downloaded from the server. Preferably, when the communication link is not needed to download blocks required for currently rendered images, the processor downloads blocks in the vicinity of the viewpoint. Preferably, the processor stores in the cache memory an equal number of blocks from each resolution level. Further preferably, the number of blocks in the cache memory is such that the cache memory has all the required blocks to render the view from the current viewpoint in any view direction. Preferably, when downloading blocks, the processor first downloads blocks from lower resolution levels.

Preferably, when the processor requires a number of blocks, the first block sent is the block of the lowest level. If two blocks of the same level are required, the one which is requested last is sent first. Thus, when the viewpoint changes, the blocks sent first are for the new viewpoint, and only afterwards are blocks sent for the old viewpoint. Preferably, if a block requested earlier is relatively far from the viewpoint, it is not sent, since it is obviously not needed anymore.

Preferably, when the processor needs to render a new image, the processor first uses the data blocks stored in the cache memory and concurrently sends download orders for higher resolution level blocks.

In some preferred embodiments of the present invention, the processor runs a rendering program which displays the three dimensional images based on the viewpoint, the size of the displayed image and the blocks received from the server. The rendering program orders the blocks it needs using a cache manager, which is preferably a software routine running on the processor. If the cache manager has the ordered block, it provides it to the rendering program. However, if the block is not carried by the cache manager, it is ordered from the server, and a replacement block from a lower resolution level is passed to the rendering program.

When the rendering program requires a block including a new point or area for display, the cache manager first requests the block of the lowest resolution level which covers the area with the least detail and then requests subsequent blocks with successively increasing detail, until the block with the level of detail required by the rendering program is sent. The rendering program renders the three-dimensional image using the blocks it has on hand. Each time another block is received, the image is rendered again. Thus, the user sees an image at substantially all times and is not prevented from moving the viewpoint while additional data is being sent from the server.

There is therefore provided in accordance with a preferred embodiment of the present invention, a method of providing data blocks describing three-dimensional terrain to a renderer, the data blocks belonging to a hierarchical structure which includes blocks at a plurality of different resolution levels, the method including receiving from the renderer one or more coordinates in the terrain along with indication of a respective resolution level, providing the renderer with a first data block which includes data corresponding to the one or more coordinates, from a local memory, and downloading from a remote server one or more additional data blocks which include data corresponding to the one or more coordinates if the provided block from the local memory is not at the indicated resolution level.

Preferably, providing the first data block includes providing the data block from the highest resolution level which includes data corresponding to the one or more coordinates.

Preferably, downloading the one or more additional data blocks includes downloading a block at a resolution level higher than the resolution level of the first block.

Further preferably, downloading the one or more additional data blocks includes downloading the blocks from a succession of resolution levels, from the level immediately higher than the resolution level of the first block up to the maximal existent resolution level on the server not above the indicated resolution level.

Preferably, receiving from the renderer the one or more coordinates includes receiving a plurality of coordinates included in a plurality of respective distinct blocks, and downloading the one or more blocks includes downloading blocks including data corresponding to at least some of the plurality of coordinates.

Preferably, downloading the blocks includes downloading the blocks in an order determined according to their resolution levels.

Further preferably, downloading the blocks includes downloading blocks of lower resolution levels before blocks of higher resolution levels.

Preferably, downloading the blocks includes downloading first the block for which the coordinates were provided last among blocks at a common resolution level.

Preferably, downloading the blocks includes downloading the blocks according to the order in which the coordinates were provided.

Preferably, downloading the blocks includes downloading first the block for which the coordinates were provided last.

Preferably, the method includes downloading excess blocks not currently needed by the renderer to fill up the local memory when not downloading blocks required by the renderer.

Preferably, the renderer renders a view from a current viewpoint, and downloading the excess blocks includes filling the local memory with substantially all of the blocks surrounding a point in the terrain seen from the current viewpoint within a predetermined distance range.

Preferably, downloading excess blocks includes filling the local memory with substantially the same number of blocks from each different resolution level.

Preferably, filling the local memory includes filling the memory with substantially all the blocks within the range from a lower resolution level before downloading blocks of higher resolution levels.

Preferably, downloading the data blocks includes downloading the blocks via the Internet.

There is further provided in accordance with a preferred embodiment of the present invention, a method of displaying three dimensional images, including establishing a communication link between a local processor and a server, transferring data blocks describing terrain over the communication link from the server to the local processor; and rendering a three-dimensional terrain image at the local processor responsive to the data blocks.

Preferably, establishing the communication link includes establishing a low-speed communication link.

Preferably, transferring the data blocks includes transferring the blocks via the Internet.

Further preferably, transferring the data blocks includes transferring the blocks responsive to a list of coordinates generated by the processor.

Preferably, the list of coordinates is prepared responsive to a viewpoint from which the image is rendered.

Preferably, the viewpoint changes over time following a predetermined course.

Preferably, the predetermined course is received from the server.

Preferably, the predetermined course describes a suggested course for landing in an airport.

Preferably, a user of the processor changes the view direction from the viewpoint without removing the viewpoint from the predetermined course.

Preferably, the viewpoint is controlled by a user of the processor.

Preferably, transferring the data blocks includes transferring blocks which include altitude data of the terrain.

Preferably, transferring the data blocks includes transferring blocks which include optional objects to be overlaid on the terrain.

Preferably, rendering the images includes rendering the images with at least some of the optional objects according to settings of the user of the local processor.

There is further provided in accordance with a preferred embodiment of the present invention, a method of pilot training, including loading a course of a flight vehicle into a local processor, establishing a communication link between the processor and a server, transferring data blocks describing terrain viewed from the course over the communication link from the server to the local processor, and rendering a three-dimensional terrain image at the local processor responsive to the data blocks.

Preferably, the course describes a suggested course for landing in an airport.

There is further provided in accordance with a preferred embodiment of the present invention, apparatus for providing data blocks describing three-dimensional terrain to a renderer, the data blocks belonging to a hierarchical structure which includes blocks at a plurality of different resolution levels, the apparatus including a local memory, which stores data blocks corresponding to coordinates proximal to a current viewpoint of the renderer, a communication link, through which the memory receives the data blocks from a remote server, and a processor which receives one or more specified coordinates along with indication of a respective resolution level from the renderer, provides the renderer with a first data block which includes data corresponding to the one or more specified coordinates from the local memory, and downloads over the communication link one or more additional data blocks which include data corresponding to the one or more coordinates if the first block is not from the indicated level.

Preferably, the processor provides the first data block from the highest resolution level which includes the one or more coordinates currently available in the local memory.

Preferably, the processor downloads a block of a resolution level higher than the resolution level of the first block.

Preferably, the processor downloads blocks from the resolution level immediately higher than the resolution level of the first block up to a maximal resolution level of blocks stored on the server that is not above the indicated resolution level.

Preferably, the processor receives from the renderer a plurality of coordinates included in a plurality of respective distinct blocks and downloads blocks including at least some of the plurality of coordinates.

Preferably, the processor downloads the blocks in an order determined according to their resolution levels.

Preferably, the processor downloads blocks of lower resolution levels before blocks of higher resolution levels.

Preferably, the processor downloads in first precedence the block for which the coordinates were provided last among blocks from a common resolution level.

Preferably, the processor downloads the blocks according to the order in which the coordinates were provided.

Preferably, the processor downloads in first precedence the block for which the coordinates were provided last.

Preferably, the processor downloads excess blocks not currently needed by the renderer to fill up the local memory when not downloading blocks required by the renderer.

Preferably, the renderer renders a view from a current viewpoint and the processor fills the local memory with substantially all the blocks surrounding a point in the terrain seen from the current viewpoint in a predetermined range.

Preferably, the processor fills the local memory with substantially the same number of blocks from each resolution level.

Preferably, the processor fills the local memory with substantially all the blocks from a lower level before downloading blocks of higher resolution levels.

Preferably, the communication link includes a connection to the Internet.

There is further provided in accordance with a preferred embodiment of the present invention, an apparatus for displaying three dimensional images, including a processor, a communication link between the processor and a server over which data blocks describing terrain are transferred, and a display on which the processor renders three-dimensional terrain images responsive to the data blocks.

Preferably, the communication link includes a low-speed communication link.

Preferably, the data blocks are transferred responsive to a list of coordinates from the processor.

Preferably, the list of coordinates is prepared responsive to a viewpoint from which the image is perceived.

Preferably, the viewpoint follows a predetermined course.

Preferably, the predetermined course is received from the server.

Preferably, the predetermined course describes a suggested course for landing in an airport.

Preferably, a user of the processor may change the view direction from the viewpoint without moving the viewpoint from the predetermined course.

Preferably, the viewpoint is controlled by a user of the processor.

Preferably, the communication link includes a connection to the Internet.

There is further provided in accordance with a preferred embodiment of the present invention, pilot training apparatus, including a processor which tracks a predetermined course of a flight vehicle, a communication link between the processor and a server over which data blocks describing terrain are transferred responsive to the course, and a display on which the processor renders three-dimensional terrain images viewed from the course responsive to the data blocks.

The present invention will be more fully understood from the following detailed description of the preferred embodiments thereof, taken together with the drawings in which:

DETAILED DESCRIPTION OF PREFERRED EMBODIMENTS

Figure 1:
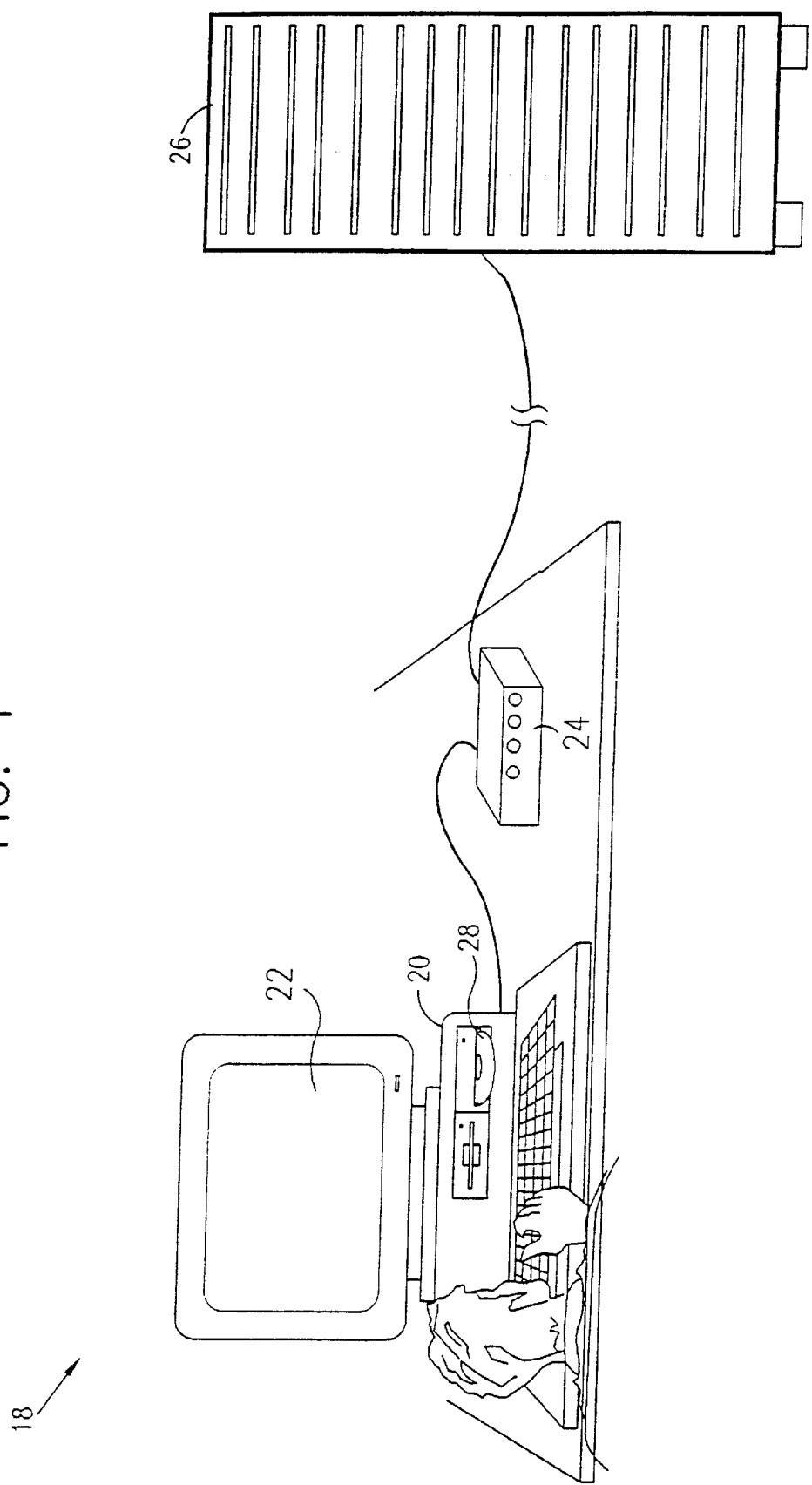
FIG. 1 is a schematic illustration of a system for displaying real-life terrain images, in accordance with a preferred embodiment of the present invention.

FIG. 1 is a schematic illustration of a system 18 for displaying real-life terrain images of a flight course, in accordance with a preferred embodiment of the present invention. System 18 preferably comprises a processor 20, such as a Pentium-Pro MMX processor, and a display 22, which are used by an end-user to view 3D real-life images of terrain of desired sites. Preferably, system 18 comprises a modem 24 through which processor 20 communicates with a computerized database server 26 of 3D terrain images. Modem 24 is, for example, a standard 33,600 kb/sec modem, although other modems, faster and slower may also be employed. Alternatively, other means of connection, such as ISDN connections or direct routers, may be used instead of modem 24. Preferably, processor 20 communicates with server 26 over a public network, such as the Internet. Alternatively or additionally, processor 20 communicates with server 26 through a direct communication line. Further alternatively or additionally, processor 20 receives a storage disk 28, such as a CD, from server 26 or from any other distribution source.

Figure 2:
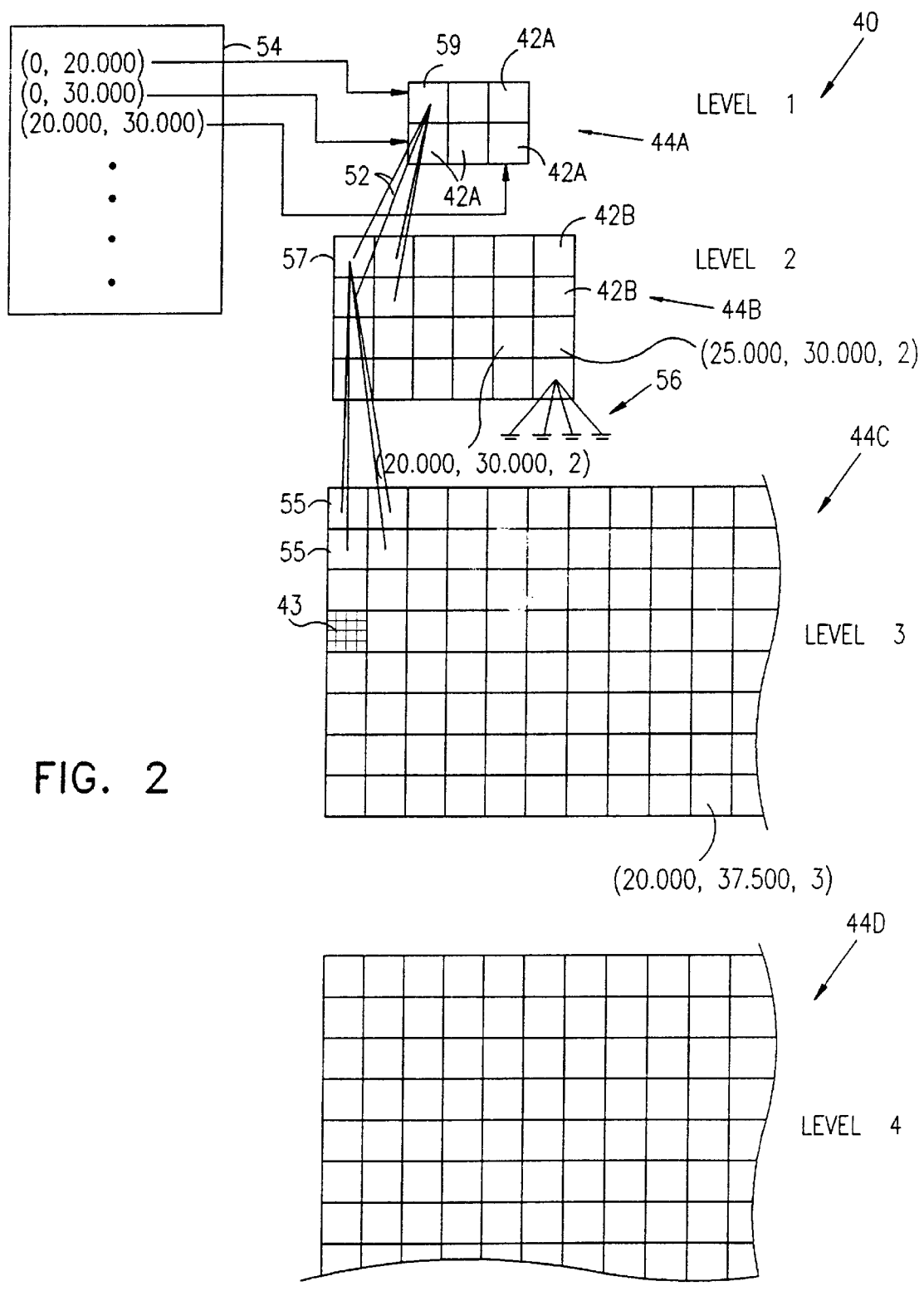
FIG. 2 is a schematic block diagram illustrating the data structure of images stored in a database on a pilot training server, in accordance with a preferred embodiment of the present invention.

FIG. 2 is a schematic illustration of the data structure of images stored in a database 40 on server 26, in accordance with a preferred embodiment of the present invention. Database 40 comprises a plurality of image blocks 42, labeled 42A, 42B, etc., which contain data representing the terrain in various areas as would be perceived from different heights. Preferably, substantially all of blocks 42 are of the same data size. Preferably, the size of the blocks is determined according to the expected rate of transmission of data via modem 24, so that a block 42 may be transmitted on the average within a predetermined amount of time, for example, half a second. In a preferred embodiment of the present invention, the blocks comprise 256×256 pixels, although the blocks may be of any other suitable size. Preferably, the blocks are divided into sub-blocks 43 of smaller sizes, such that processors which work with slow modems may download small sub-blocks in case the entire block is not required. In a preferred embodiment of the present invention, each block 42 is divided into sixteen sub-blocks 43 of 64×64 pixels. Each pixel is preferably represented by a color and an elevation attribute, as is known in the art. Blocks 42 are preferably real-life images of terrain areas received from airborne or satellite cameras.

Preferably, each sub-block 43 includes an attachment field in which additional optional data objects associated with the area covered by the sub-block are described. These objects preferably include, but are not limited to, labels, annotations, lines and 3D objects. Each object is preferably accompanied by coordinates which state the position of the object within sub-block 43. Preferably, the labels are stored in text format, the lines are stored as vectors, and the 3D objects are stored as polygons, although any suitable storage format may be used.

The objects may be used to represent existing structures which are not viewed sufficiently well when shown as part of the image. Alternatively or additionally, the structures may be used to overlay virtual structures on the terrain. For example, it is possible to add planned buildings to the terrain and thus see the effect of the buildings on the view. Further alternatively or additionally, the objects may be used to overlay map symbols and other markings on the terrain. The markings are preferably overlaid on the view at a constant size regardless of the resolution level of the terrain displayed.

Blocks 42 are preferably stored in database 40 in a compressed form using any suitable compression method, such as JPEG. Blocks 42 are classified in successive resolution levels 44 labeled 44A, 44B, etc., according to the height from which they view the terrain and, therefore, the level of detail which they include. A plurality of blocks 42A which belong to the lowest resolution level 44A, labeled "level 1," cover the largest area per block and therefore have the least detail per area unit. It is noted that the size of the geographical area covered by blocks 42A of "level 1" is dependent on the specific application of database 40 and may be very diverse. For example, in some flight applications, a single block 42A includes an image of the entire Planet Earth, while in an atom-simulation application, which shows the terrain of an atom, block 42A shows the entire atom. Blocks 42B of the next level 44B, labeled "level 2," preferably cover a quarter of the area of blocks 42A of "level 1". Thus, for substantially each block 42A, there exist four blocks 42B which cover the same area. In a similar manner, each successive level 44 comprises blocks 42 which cover a quarter of the area of the blocks 42 of the lower resolution level.

Four blocks 55 of a certain level 44C, which cover the same area as a block 57 of the preceding level 44B, are referred to as descendants of block 57. Conversely, block 57 is referred to herein as the parent of blocks 55. The parent block 59 of block 57 is referred to herein as an "ancestor" of blocks 55, and is said to be of a lower resolution level than its descendants. It is noted that in FIG. 2, the lower resolution levels appear higher on the page.

Preferably, each block 42 database 40 includes pointers 52 to the four descendants of the block. If one or more of the descendants does not exist, a null pointer 56 is preferably used. Preferably, a header record 54 comprises an index to blocks 42A of "level 1" such that processor 20 can easily find the block 42A which covers a desired area.

The number of levels 44 is dependent on the images input to server 26 and may differ for different areas of terrain. Thus, one block 42A may have descendants up to level 12, for example, while another block 42A may have no descendants. It is also noted that the number of descendants of each block 42 may have a value different from four, for example nine, and may differ for different levels 44.

Preferably, each block 42 is referenced using longitudinal and latitudinal (x,y) coordinates of one of the points in the block, such as the top right corner pixel, together with the resolution level 44 of the block.

Figure 3:
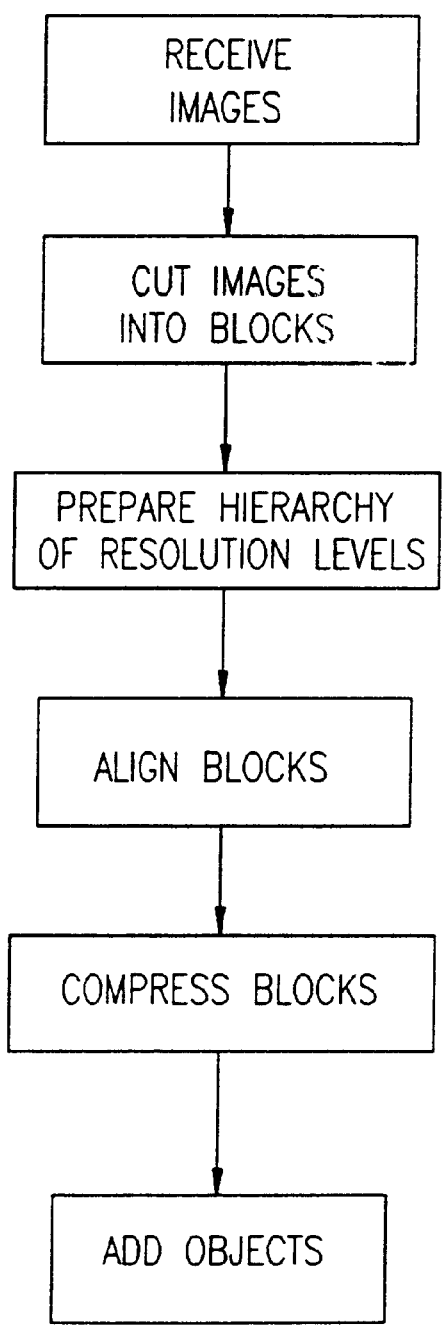
FIG. 3 is a flow chart illustrating a method for preparation of a pilot training database, in accordance with a preferred embodiment of the present invention.

FIG. 3 is a flow chart illustrating a method for preparation of database 40, in accordance with a preferred embodiment of the present invention. Preferably, all the steps described in FIG. 3 are performed automatically by a processor (referred to herein as a Terra builder). The Terra Builder may prepare the images on-line provided the images are supplied at a sufficient rate. Alternatively or additionally, the Terra Builder operates together with a human operator to achieve better accuracy in the preparation of database 40.

Preferably, the Terra builder receives one or more images of a terrain area covered by the database. The images are preferably received in a standard format, such as TIFF or bitmap. The images preferably cover adjacent areas or are partially overlapping. Some of the images may cover the same area at different levels of resolution.

The processor cuts the image up into blocks 42 and assigns these blocks temporarily to the highest resolution level. Blocks of lower levels of resolution are prepared by eliminating data from the original blocks. Preferably, the blocks of lower resolution levels are prepared by decimation, for example, by eliminating odd (or even) rows and columns from the higher level blocks. Further preferably, the blocks are filtered using a low pass filter, most preferably before the decimation.

Thereafter, the blocks from different images are aligned relative to each other, based on the coordinates of the images and the meter-per-pixel resolution values of the images. Preferably, the coordinates and meter-per-pixel values are received together with the images. Alternatively, an operator determines and inputs the coordinate correspondences and meter-per-pixel values by viewing the images. Further alternatively or additionally, the operator inputs the heights of the terrain for some or all of the pixels.

Blocks 42 are then compressed, for example, using the JPEG compression method. The operator may add labels, lines, virtual structures and other objects, before or after the compression. Alternatively or additionally, the processor automatically derives such objects from the images. For example, the processor may identify roads and/or runways in the images and represent them as objects so that they appear more clearly in substantially any resolution of display.

It is noted that although the hierarchical structure of database 40 requires extra storage space, relative to a non-hierarchical record of the terrain, the advantages of use of the hierarchical structure justify the extra storage space required. The use of the hierarchical structure allows faster rendering of the images on display 22 and allows fast download of required images at low resolution levels. Optionally, in order to reduce storage requirements, some of blocks 42 are stored only in some of resolution levels 44, and when non-existent resolution levels are required, server 26 generates the required block from a descendant block of a higher resolution level.

Preferably, the user of processor 20 is able to add virtual structures and/or other objects to the terrain described by database 40, while viewing the terrain. Preferably, a file stored locally on processor 20 stores descriptions of the virtual structures added by the user of processor 20.

Figure 4:
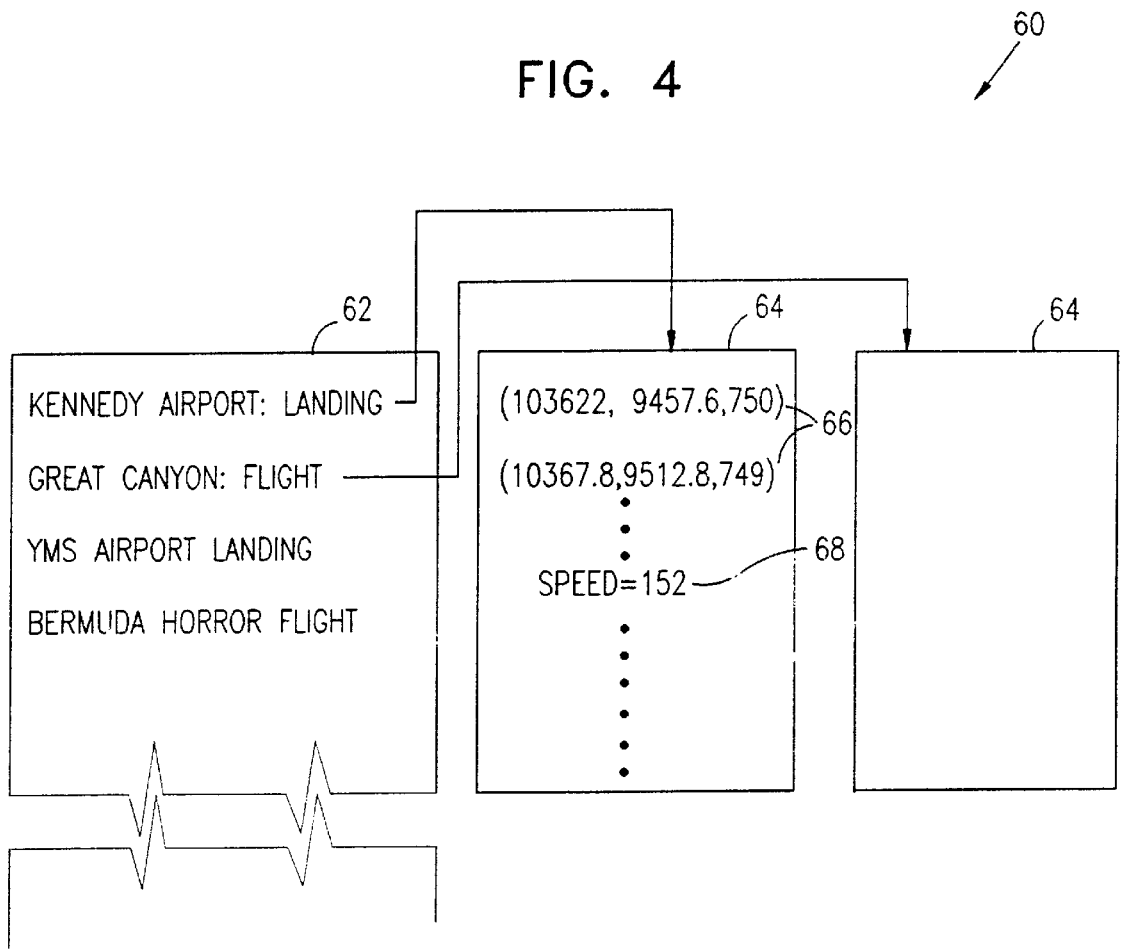
FIG. 4 is a schematic block diagram illustrating a flight course database on a pilot training server, in accordance with a preferred embodiment of the present invention.

FIG. 4 is a schematic block diagram illustrating a course database 60 stored on server 26, in accordance with a preferred embodiment of the present invention. Preferably, course-database 60 includes a catalog file 62, which lists all the available routes on server 26. For each route, database 60 preferably includes a list 64 of three-coordinate points 66 which describe the route. The three coordinates preferably represent longitudinal, latitudinal, and height coordinates of the points along the course, as are known in the art of terrain mapping. Preferably, list 64 also includes speed settings 68, and/or other flight-relevant data.

The routes in database 60 preferably include routes terminating in landings at various airports. Using these routes, pilots may become familiar with airports to which they are scheduled to fly. Alternatively or additionally, database 60 includes routes of flight through difficult access areas, such as deep canyons in which helicopters need to fly. Further alternatively or additionally, database 60 may include routes for training military pilots in approaching a required target.

It is noted that other scenarios may be included in database 60, such as on-line images from an area of interest. For example, a route may be used to display a car race, and the points 66 describing the route may be received on-line using a GPS from one of the cars in the race. The cars are preferably superimposed on the images, using methods known in the art. A user watching the race on a home computer may select any viewpoint of interest and is not limited to pre-chosen viewpoints selected by others.

Figure 5:
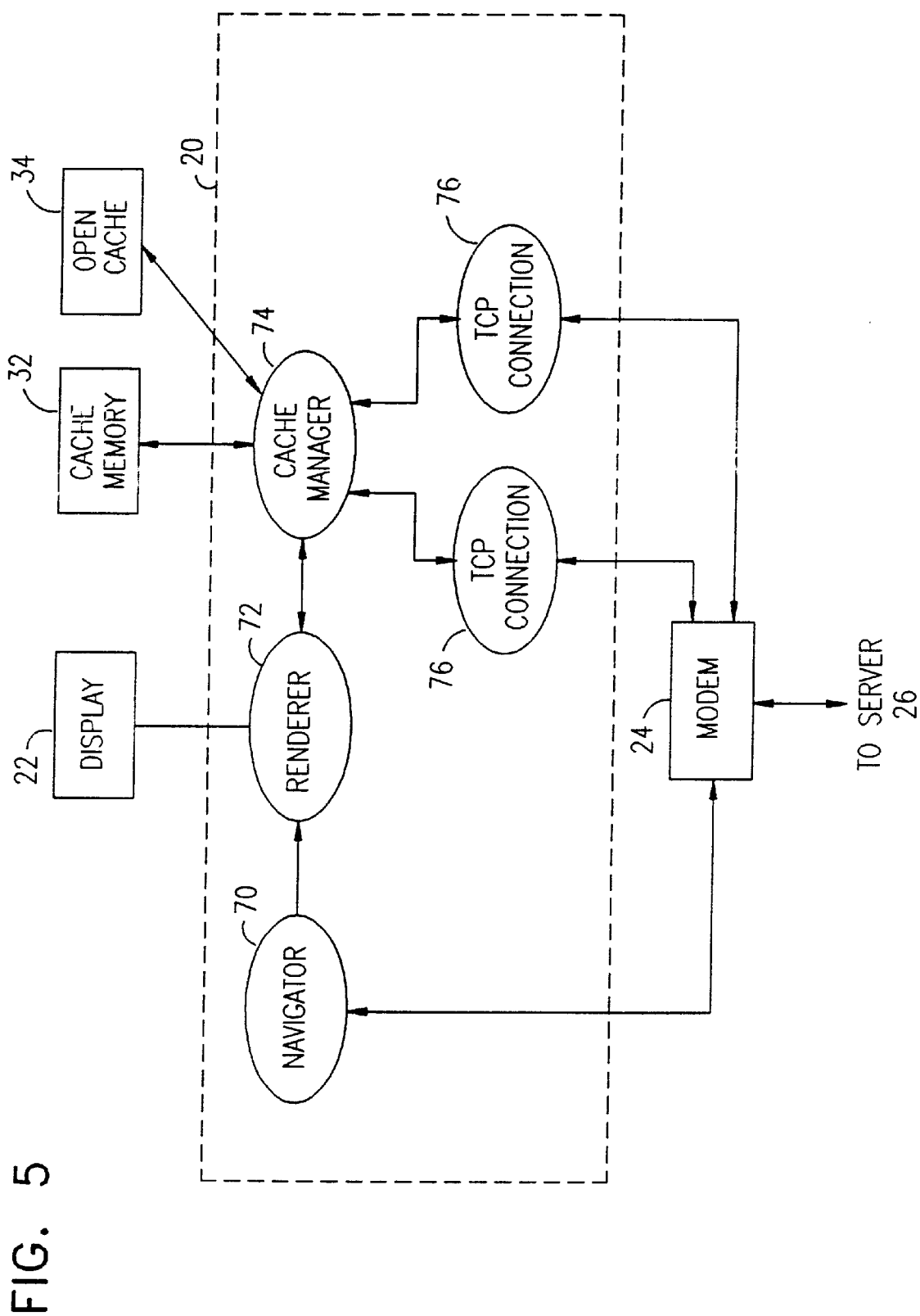
FIG. 5 is a schematic block diagram illustrating a processor for viewing three-dimensional real-life terrain images, in accordance with a preferred embodiment of the present invention.

FIG. 5 is a schematic block diagram of processor 20, in accordance with a preferred embodiment of the present invention. The blocks are preferably realized as software processes running on a general-purpose microcomputer, although dedicated hardware realizations are also possible. Preferably, processor 20 comprises a navigator 70, which keeps track of a viewpoint of a virtual viewer. The viewpoint preferably follows a predetermined course which a user of processor 20 is supposed to follow. Preferably, the course is received from course database 60.

Preferably, navigator 70 sets a default view direction of the viewpoint in the direction of movement along the course. Alternatively, the default view direction is set directly down towards the terrain. The user may change the view direction of the viewpoint without moving out of the course. Therefore, there is no compulsory correlation between the flight direction and the view direction. Preferably, the user may change the speed of motion along the course. Further preferably, the user may move the viewpoint out of the course in order to view the area around the predetermined course, or to try to find a better course. Preferably, the user controls the direction, speed, altitude and/or any other parameter of the viewpoint. Specifically, the user may freeze the viewpoint in order to have a better look at the view from a certain point or angle.

Processor 20 preferably further comprises a renderer 72, which calculates the view from the viewpoint and continuously renders the view on display 22. Renderer 72 determines the coordinates of the pixels it needs in order to render the view and requests the descriptions of these pixels from a cache manager 74. Preferably, renderer 72 determines which blocks 42 and/or sub-blocks 43 include the required pixels. Alternatively, cache manager 74 determines the identity of the required blocks 42 and/or sub-blocks 43. Along with each required pixel, block 42, or sub-block 43, renderer 72 preferably states the resolution level 44 at which the block is required. The resolution level is preferably determined based on the distance between the viewpoint and the desired pixel or block 42. Further preferably, the resolution level is also dependent on the number of pixels in the image displayed on display 22. Preferably, the resolution levels are chosen so that an approximate 1:1 ratio is achieved between the number of displayed pixels and the number of data pixels. Preferably, renderer 72 also overlays the objects associated with the rendered sub-blocks 43.

Preferably, cache manager 74 manages a group of blocks 42 and/or sub-blocks 43 in a cache memory 32 of processor 20, for example in the main memory of processor 20, in accordance with a method described hereinbelow. Alternatively or additionally, cache memory 32 is defined in a local hard disk associated with processor 20. Thus, even if processor 20 is shut down, the renderer can immediately resume operation when the processor is turned on again, at the point it left off, without downloading the data again from server 26. Further alternatively or additionally, processor 20 determines areas which are most commonly visited by the user of the processor, and blocks 42 from these areas are permanently stored in the local hard disk of processor 20. One such preferred application involves positioning processor 20 within a ground vehicle in order to view the surroundings of the vehicle. Since the vehicle is usually located in the same area, the required download time may be reduced substantially.

It is noted that the term cache memory is used herein generally to refer to any relatively small memory which can be accessed rapidly by processor 20 and is used to save data which is most likely to be used by the processor.

Cache manager 74 downloads from server 26 the blocks 42 and/or sub-blocks 43 required by renderer 72, if they are not already stored in cache memory 32, and meanwhile provides replacement blocks from the cache memory. Preferably, cache manager 74 references blocks 42 on server 26 by providing pointers to the required blocks. Cache manager 74 has the pointers for the lowest resolution level blocks 42A from header record 54. The pointer to a desired block 42 of any other level 44 is preferably taken from the parent block of the desired block, as described above. Therefore, as described hereinbelow, cache manager 74 preferably always requests that server 26 send a block 42 after the cache manager has received its parent block.

Preferably, processor 20 establishes one or more communication connections 76 with server 26 through which blocks 42 are sent to the processor. Connections 76 are preferably standard TCP connections as are known in the art, although any other protocol may be used to form the connection. Preferably, when connections 76 are not in use bringing blocks 42 required by renderer 72, cache manager 74 downloads blocks in the area of the viewpoint to fill cache memory 32. Preferably, cache manager 74 attempts to fill cache memory 32 with a sufficient number of blocks, such that for any view direction of the current viewpoint, all blocks 42 required by renderer 72 are stored in cache memory 32. Preferably, cache manager 74 stores in cache memory 32 the same number of blocks 42 in each resolution level 44. Preferably, cache memory 32 stores, for each resolution level 44, between 9 and 36 blocks, which are most preferably organized in a square centered directly below the location of the viewpoint. In a preferred embodiment of the present invention, cache memory 32 stores sixteen blocks 42 organized in a square for each resolution level 44. Blocks 42 are preferably chosen such that the viewpoint is closest to the center of the square, most preferably, as described in the above-mentioned U.S. patent application Ser. No. 08/939, 948.

Preferably, blocks 42 are stored in cache memory 32 in the compressed form in which they are received from server 26. Further preferably, cache manager 74 decompresses the blocks before they are provided to renderer 72. Preferably, cache manager 74 manages, in addition to cache memory 32, an open cache memory 34 in which blocks 42 and/or sub-blocks 43 which were decompressed are stored. Preferably, open cache memory 34 is of a size determined according to the amount of available empty storage space on the memory associated with processor 20 and/or the size of the image rendered on display 22. Preferably, the user of processor 20 may adjust the size of open cache memory 34 in order to achieve maximal rendering speed by saving the time required for decompression. In a preferred embodiment of the present invention, open cache memory 34 has a default size sufficient to store a few hundred decompressed sub-blocks 43.

Preferably, when open cache memory 34 is full, a least recently used (LRU) method is used to determine which sub-block 43 is to be discarded to make room for a new sub-block. A preferred LRU method is described in the above-mentioned Ser. No. 08/939,948 patent application. Alternatively or additionally, any other suitable method of memory management may be used to manage cache memory 32 and/or open cache memory 34.

Renderer 72 uses blocks 42 from cache manager 74 to render the required view on display 22. Preferably, when cache manager 74 provides a block 42 of a lower resolution level than that requested by renderer 72, the renderer uses the provided block to interpolate a higher resolution-level block. Preferably, the higher resolution-level block is interpolated using any method known in the art, such as bilinear, fractal, or texture blending.

When cache manager 74 finishes downloading an additional block of a higher resolution level from server 26, the block is provided to renderer 72, which updates the rendered view accordingly. Preferably, when the viewpoint is in motion, renderer 72 updates the view at least ten times per second so that the user has a perception of constant movement, although other rates of update may also be used. Preferably, renderer 72 renders the view each time from scratch without using previously-rendered views.

Preferably, renderer 72 is as described in the above mentioned U.S. patent application Ser. No. 08/939,948. Alternatively or additionally, renderer 72 may operate in accordance with any other method known in the art. Renderer 72 is preferably implemented entirely in software. Alternatively, renderer 72 includes a dedicated hardware processor, such as a 3D graphic accelerator, along with a software package running on general purpose processor 20 which provides blocks 42 to the dedicated hardware processor.

Figure 6:
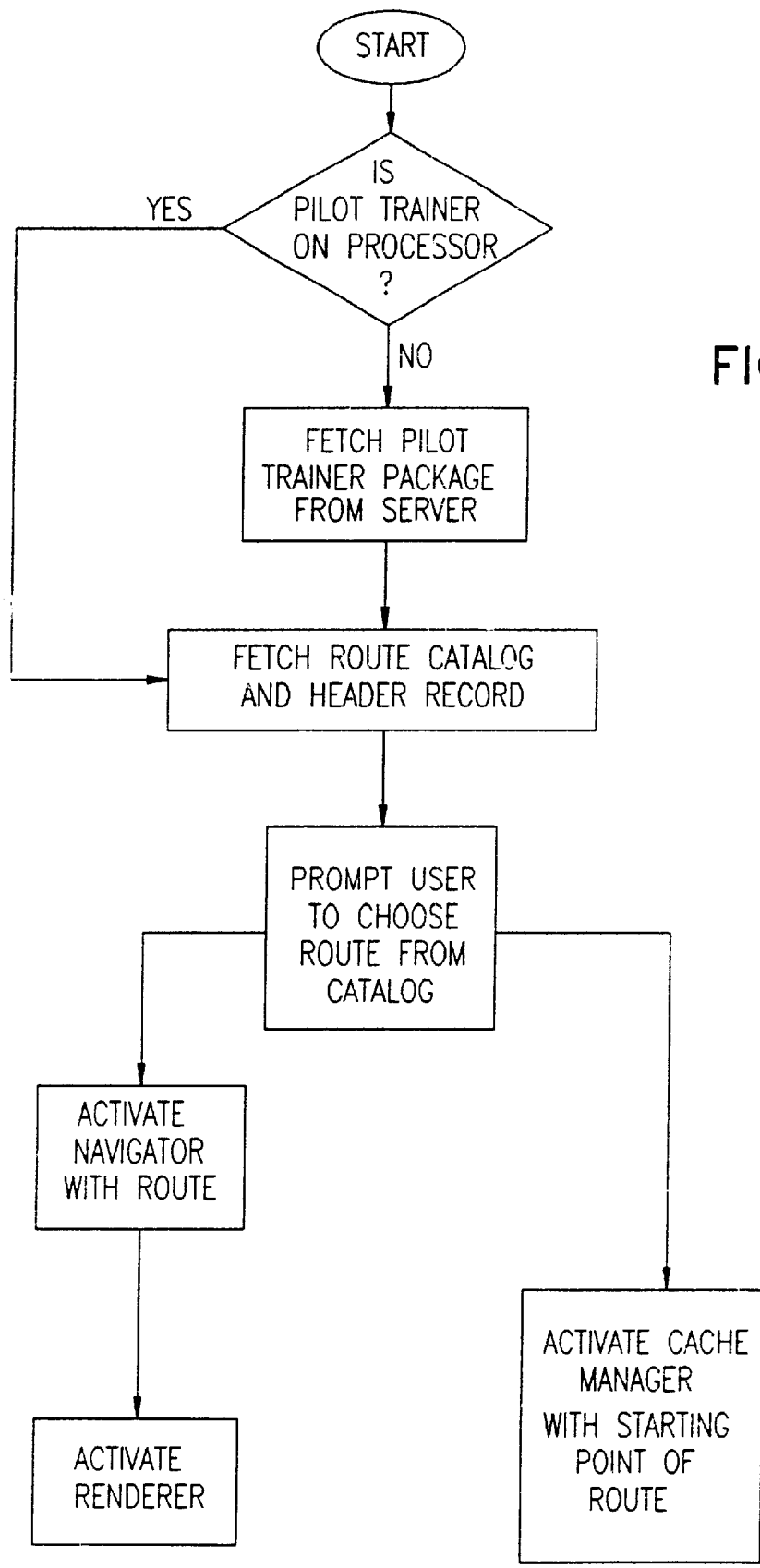
FIG. 6 is a flow chart illustrating the actions of the processor of FIG. 4 in displaying a selected route, in accordance with a preferred embodiment of the present invention.

FIG. 6 is a flow chart showing the actions of processor 20 in selecting and displaying a flight route, in accordance with a preferred embodiment of the present invention. Preferably, when processor 20 accesses server 26 for the first time, the server sends processor 20 a software package which includes navigator 70, renderer 72 and cache manager 74. Preferably, the software package is in the form of an ActiveX plug-in sent to a network browser running on processor 20, as is known in the art. Alternatively or additionally, the user of processor 20 may receive the software package on a compact disk (CD) or on any other storage media. Preferably, the software package is stored by processor 20 so that the package need be sent only once.

Thereafter, server 26 sends catalog 62 and/or header record 54 to processor 20. The user of processor 20 chooses a desired route from catalog 62, and navigator 70 downloads the route from server 26, preferably using one or more of TCP connections 76. Navigator 70 begins to run on the downloaded route, and concurrently cache manager 74 is ordered to download one or more, preferably four, level 1 blocks 42A surrounding the starting point of the route. Thus, cache manager 74 will have in local cache memory 32 images of a very large area surrounding the starting point. Cache manager 74 can therefore provide images which cover substantially any area for which renderer 72 may request images, even if only at a low resolution level initially. Alternatively or additionally, the user may choose to begin a tour at a specific location, without referring to a specific route.

Preferably, the user is able to decide whether to display some or all of the objects associated with the database. Thus, the user may request to view only the images without any of the objects, or to see only objects which represent existing structures. Preferably, the user is able to request to view the images with or without labels. Thus, on a first visit to a new area, the user may view the area with labels which allow easy acquaintance with the area, while at a second visit, the user may omit the labels in order to test whether he/she has properly memorized the important labeled landmarks. Preferably, the user is able to switch between viewing the terrain with and without the objects, so that, for example, the user may easily compare the view of a desired area with and without a group of planned structures.

Figure 7:
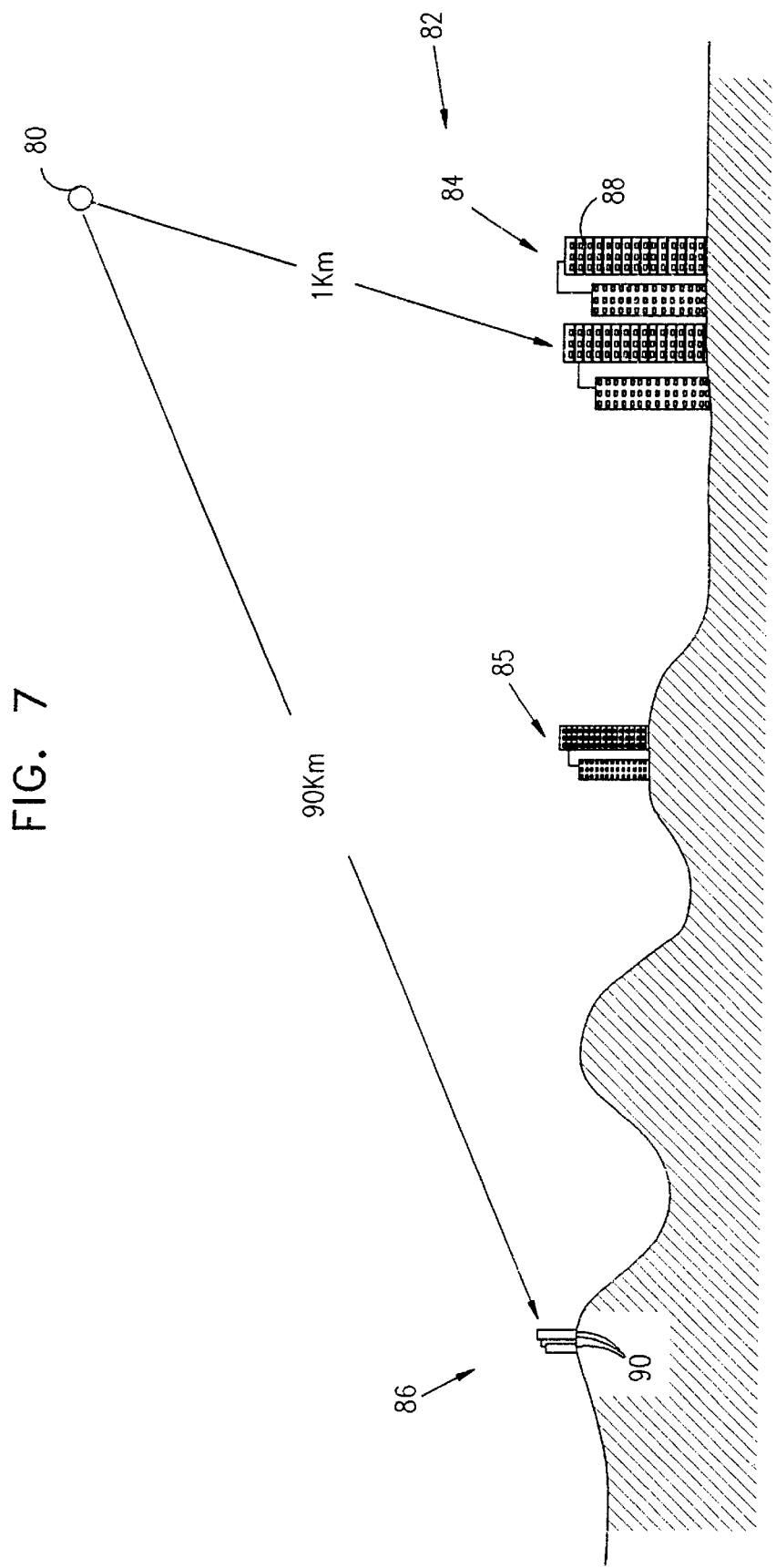
FIG. 7 is a schematic view of a viewpoint and a scene viewed therefrom, useful in understanding a method of displaying the selected route, in accordance with a preferred embodiment of the present invention.

FIG. 7 is a schematic view of a viewpoint 80 and a scene 82 viewed therefrom, used to explain the operation of renderer 72, in accordance with a preferred embodiment of the present invention. Scene 82 includes areas 84 close to viewpoint 80, for example 1 kilometer from the viewpoint. Other areas 86 of scene 82 are far away from viewpoint 80, for example, 50–100 kilometers away. Still other areas 85 of scene 82 may be at other distances from viewpoint 80. In order to build a real life image of the view from viewpoint 80, renderer 72 needs blocks 42 from a high resolution level 44 of area 84, such that a group of buildings 88 in area 84 are seen in the image as they would be seen from 1 kilometer away. However, for area 86, renderer 72 needs only a low resolution level block 42 since a group of buildings 90 in area 86 would not be seen from viewpoint 80.

Preferably, renderer 72 determines the exact blocks needed and calls for them using their (x,y) coordinates and their resolution level 44. Alternatively or additionally, renderer 72 specifies, for each resolution level 44, the coordinates of the boundaries of the necessary areas, and cache manager 74 determines the identities of the required blocks 42. Preferably, when only a small part of a block 42 is required, cache manager 74 orders only the required sub-blocks 43 in order to save transmission time. On the average, rendering a view image requires between about 20 and 200 sub-blocks 43 of various resolution levels 44.

Figure 8:
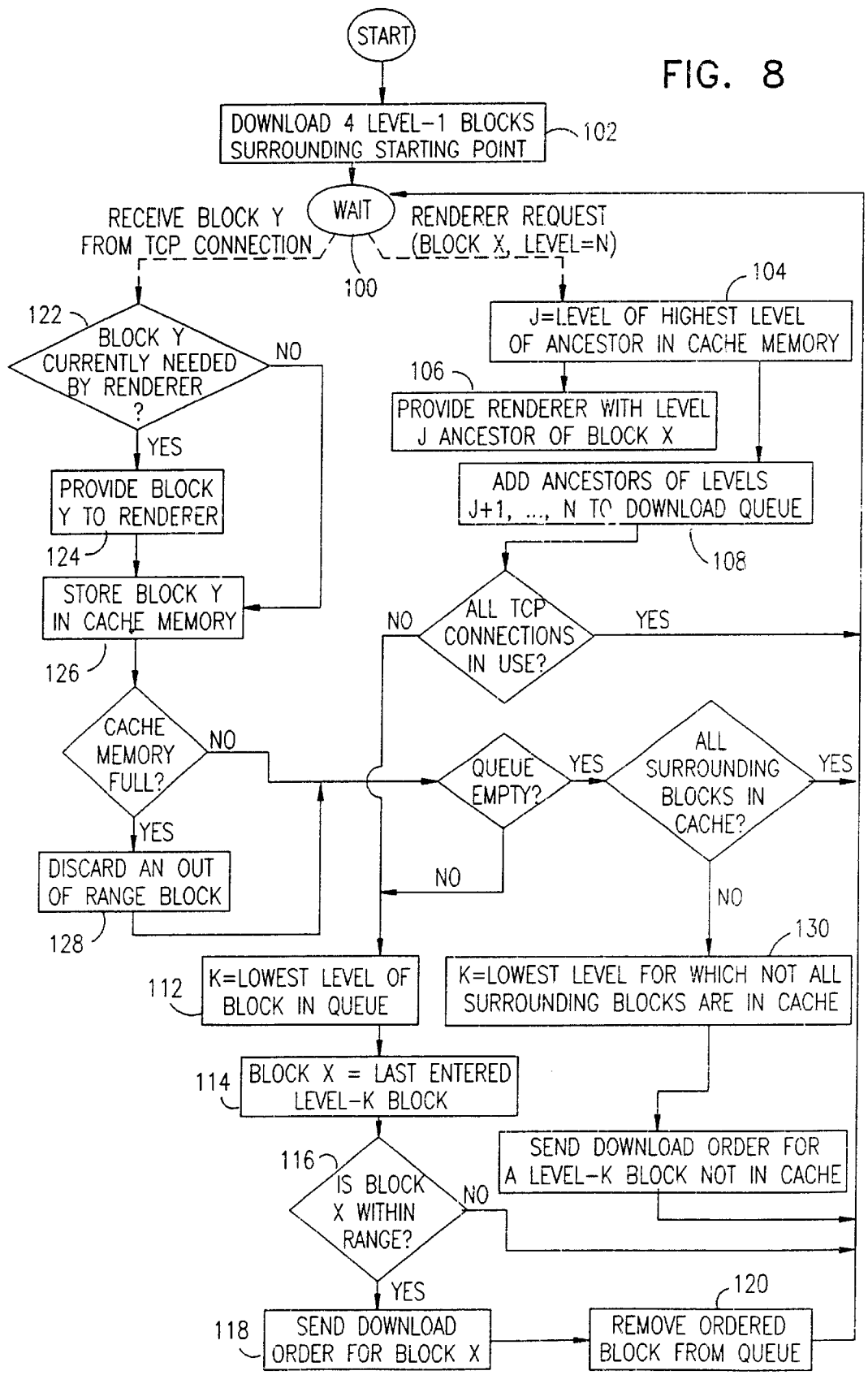
FIG. 8 is a flow chart illustrating the actions of a cache manager while the processor of FIG. 4 displays a selected route, in accordance with a preferred embodiment of the present invention.

FIG. 8 is a flow chart illustrating the actions of cache manager 74 in displaying a selected route by processor 20, in accordance with a preferred embodiment of the present invention. After downloading the first batch of level 1 blocks, as indicated in block 102, cache manager 74 moves into a wait state, as indicated by block 100.

Figure 9:
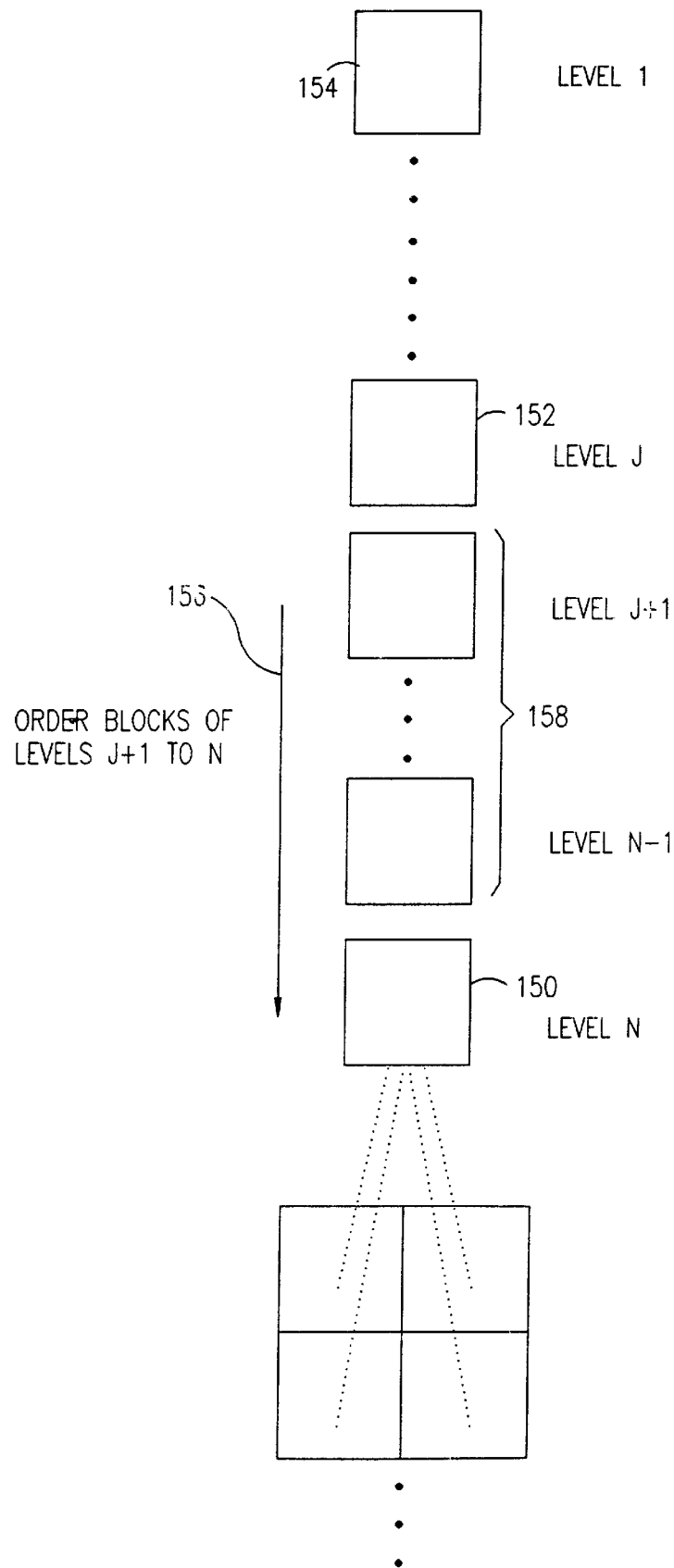
FIG. 9 is a schematic illustration of an image block from the data structure of FIG. 2, along with its ancestors, useful in understanding the flow chart of FIG. 8.

Reference is also made to FIG. 9, which is a schematic illustration of a block 150 (corresponding either to one of blocks 42 or one of sub-blocks 43) requested by renderer 72, and ancestors 152, 154 and 158 of the requested block. When a request for block 150, identified as "x," and having resolution level N, is received from renderer 72, cache manager 74 determines, as indicated in block 104 (FIG. 8), the level j of the highest resolution-level ancestor of block x stored in cache memory 32. If the block 42 itself is stored in cache memory 32 (i.e., j=N), the block is provided to renderer 72. Otherwise, the highest resolution level ancestor 152 of block x which is stored in cache memory 32 is provided to renderer 72, as indicated in block 106. As described hereinbelow, cache manager 74 downloads the rest of the ancestors 158 of block x from server 26 in order of increasing resolution levels, as indicated by an arrow 156 in FIG. 9. As the blocks are received from the server, they are supplied to renderer 72 so that the user sees an image whose resolution increases with time.

Thus, if viewpoint 80 is not changed, or is changed relatively slowly, the resolution level of the images displayed by renderer 72 is slowly increased until the maximal desired resolution is reached. Naturally, if database 40 does not includes blocks at a desired level of resolution for a certain area, the last block supplied is of the highest existing level of resolution for that certain area.

If no ancestor of block x is found in memory 32 (an eventuality not shown in the figure), the level 1 ancestor 154 of the block is ordered from server 26, based on the pointer to the level 1 ancestor block in header record 54. While waiting for the ordered block, renderer 72 preferably renders a blank block to the display. Alternatively, renderer 72 waits until level 1 ancestor 154 is received. However, it is noted that such cases are very rare, since blocks 42A of level 1 cover very large areas, and usually, blocks 42A adjacent to the block in use are also downloaded and stored in cache memory 32.

If block x itself was not found in memory 32, cache manager 74 adds to a download queue the block x and all its ancestors 158 of resolution levels higher than level j, as indicated by block 108. If all TCP connections 76 available to processor 20 are in use, cache manager 74 returns to wait state 100 until one of connections 76 is available. If one of connections 76 is available the newly added blocks to the queue are immediately ordered. Preferably, cache manager 74 proceeds to send a download order to server 26 for the lowest resolution-level block in the download queue, as indicated by blocks 112, 114, 116 and 118. Alternatively or additionally, the download queue is managed by server 26.

Preferably, if more than one block of the lowest resolution level is in the queue, the last entered block is downloaded (so long as the block is still within range, as described hereinbelow). The downloaded block is thereafter removed from the queue, either when the download order is sent as indicated in block 120, or when the block has been completely received. Cache manager 74 preferably moves back to wait state 100 to wait for the completion of the downloading of the block.

Preferably, before a download order for block x is sent to server 26, cache manager 74 checks whether the block is still needed, as indicated by block 116. Most preferably, cache manager 74 checks whether the block is within a range of the current viewpoint such that it would meet the criteria for the cache manager to order it for download to cache memory 32. If block x is not within the range of the current viewpoint, the block is not useful for the renderer and is therefore not downloaded. This situation may occur when the viewpoint has changed substantially since block x was put into the download queue. Alternatively or additionally, cache manager 74 scans the download queue periodically for block orders which are not currently useful and must be erased from the queue.

When one of TCP connections 76 notifies cache manager 74 that the transfer of a block Y has been completed, the cache manager 74 checks whether the block is currently needed by renderer 72, as indicated by block 122. Preferably, cache manager 74 queries renderer 72 regarding each received block as to whether the renderer currently needs the block. Alternatively or additionally, cache manager 74 maintains a list of blocks for which download orders were sent, and therefore are needed by renderer 72. Preferably, renderer 72 notifies cache manager 74 of blocks it requested and did not receive which it does not need any more. Alternatively, each order from renderer 72 to cache manager 74 includes all the blocks it needs, and blocks not in the order are not needed any more by the renderer.

If renderer 72 needs the downloaded block (i.e., it was not ordered solely to fill cache memory 32, as described hereinbelow), it is passed to the renderer, as indicated by block 124. Preferably, all the received blocks are stored in cache memory 32 for later use, as indicated by block 126. If cache memory 32 is full, a block beyond the predetermined range from the current viewpoint is discarded, as indicated by block 128. Preferably, the discarded block is the least recently used block which is beyond the predetermined range. Alternatively, the discarded block is chosen from the highest resolution level for which there are blocks beyond the predetermined range.

After downloading of a block has been completed, one of connections 76 is necessarily not in use. If the download queue is not empty, a block from the queue is downloaded as described hereinabove and indicated in blocks 112, 114, 116 and 118. However, if the queue is empty, cache manager 74 fills cache memory 32 with the blocks within the range of the current viewpoint, so that, for any direction of view from the current viewpoint, there is no need to download further blocks from server 26.

Preferably, the next block downloaded for filling cache memory 32 is from the lowest resolution level for which all the blocks in the range of the viewpoint are not already in the cache memory, as indicated in block 130. Further preferably, cache manager 74 first downloads the eight blocks surrounding the block which is directly below the current viewpoint. Alternatively or additionally, the blocks are ordered according to the current view direction of the viewpoint.

It will be appreciated that although the above-described preferred embodiment relates to pilot training, other uses of displaying three dimensional terrain images are included in the scope of the present invention. Such uses include, but are not limited to, display of terrain for purposes of real estate trading, travel, education and amusement uses, in which the terrain may be shown at various levels of detail. Furthermore, the terrain is not limited to the Earth or parts thereof, and may cover other planets (real or virtual) and/or 3D views of surfaces of real or imaginary objects, such as views showing the atomic structure of a material, and the like. In addition, the data streaming methods of the present invention may be used to convey large databases of data which are to be displayed graphically, such as in graphic displays of stock values.

It will be appreciated that the preferred embodiments described above are cited by way of example, and the full scope of the invention is limited only by the claims.

What is claimed is:

1. A method of providing data blocks describing three-dimensional terrain to a renderer, the data blocks belonging to a hierarchical structure which includes blocks at a plurality of different resolution levels, the method comprising:

receiving from the renderer one or more coordinates in the terrain along with indication of a respective resolution level;

providing the renderer with a first data block which includes data corresponding to the one or more coordinates, from a local memory;

downloading from a remote server one or more additional data blocks at a resolution level higher than the resolution level of the first block which include data corresponding to the one or more coordinates if the provided block from the local memory is not at the indicated resolution level.

2. A method according to claim 1, wherein downloading the one or more additional data blocks comprises downloading the blocks from a succession of resolution levels, from the level immediately higher than the resolution level of the first block up to the maximal existent resolution level on the server not above the indicated resolution level.

3. A method of providing data blocks describing three-dimensional terrain to a renderer, the data blocks belonging to a hierarchical structure which includes blocks at a plurality of different resolution levels, the method comprising:

receiving from the renderer a plurality of coordinates in the terrain along with indication of a respective resolution level; said plurality of coordinates being included in a plurality of respective distinct blocks;

providing the renderer with first data block which includes data corresponding to at least some of the plurality of coordinates from a local memory;

downloading from a remote server one or more additional blocks which include data corresponding to a plurality of respective distinct blocks if the provided block from the local memory is not at the indicated resolution level, wherein blocks of lower resolution levels are downloaded before blocks of higher resolution levels.

4. A method of providing data blocks describing three-dimensional terrain to a renderer, the data blocks belonging to a hierarchical structure which includes blocks at a plurality of different resolution levels, the method comprising:

receiving from the renderer a plurality of coordinates in the terrain along with indication of a respective resolution level; said plurality of coordinates being included in a plurality of respective distinct blocks;

providing the renderer with first data block which includes data corresponding to at least some of the plurality of coordinates from a local memory;

downloading from a remote server one or more additional blocks which include data corresponding to a plurality of respective distinct blocks if the provided block from the local memory is not at the indicated resolution level, wherein of lower resolution levels are downloaded before blocks of higher resolution levels and the block for which the coordinates were provided last among blocks at a common resolution level is downloaded first.

5. A method of providing data blocks describing three-dimensional terrain to a renderer, the data blocks belonging to a hierarchical structure which includes blocks at a plurality of different resolution levels, the method comprising:

receiving from the renderer a plurality of coordinates in the terrain along with indication of a respective resolution level; said plurality of coordinates being included in a plurality of respective distinct blocks;

providing the renderer with first data block which includes data corresponding to at least some of the plurality of coordinates from a local memory;

downloading from a remote server one or more additional blocks which include data corresponding to a plurality of respective distinct blocks if the provided block from the local memory is not at the indicated resolution level, wherein the blocks are downloaded according to the order in which the coordinates were provided.

6. A method according to claim 5, wherein downloading the blocks comprises downloading first the block for which the coordinates were provided last.

7. A method of providing data blocks describing three-dimensional terrain to a renderer, the data blocks belonging to a hierarchical structure which includes blocks at a plurality of different resolution levels, the method comprising:

receiving from the renderer one or more coordinates in the terrain along with indication of a respective resolution level;

providing the renderer with a first data block which includes data corresponding to the one or more coordinates, from a local memory;

downloading from a remoter server one or more additional data blocks which include data corresponding to the one or more coordinates if the provided block from the local memory is not at the indicated resolution level; and downloading from a remote server excess blocks not currently needed by the renderer to fill up the local memory when not downloading blocks required by the renderer.

8. A method according to claim 7, wherein downloading the data blocks comprised downloading the blocks via the Internet.

9. A method according to claim 7, wherein the renderer renders a view from a current viewpoint, and wherein downloading the excess blocks comprises filling the local memory with substantially all of the blocks surrounding a point in the terrain seen from the current viewpoint within a predetermined distance range.

10. A method according to claim 9, wherein downloading excess blocks comprises filling the local memory with substantially the same number of blocks from each different resolution level.

11. A method according to claim 9, wherein filling the local memory comprises filling the memory with substantially all the blocks within the range from a lower resolution level before downloading blocks of higher resolution levels.

12. Apparatus for providing data blocks describing three-dimensional terrain to a render, the data blocks belonging to a hierarchical structure which includes blocks at a plurality of different resolution levels, the apparatus comprising:

a local memory which stores data blocks corresponding to coordinates proximal to a current viewpoint of the renderer;

a communication link, through which the memory receives the data blocks from a remote server;

a processor which receives one or more specified coordinates along with indication of a respective resolution level from a renderer, provides the renderer with a first data block which includes data corresponding to the one or more specified coordinates from a local memory, and downloads over the communication link one or more data blocks of a resolution level higher than the resolution level of the first block which include data corresponding to the one or more coordinates if the first block is not from the indicated level.

13. Apparatus for providing data blocks describing three-dimensional terrain to a render, the data blocks belonging to a hierarchical structure which includes blocks at a plurality of different resolution levels, the apparatus comprising:

a local memory which stores data blocks corresponding to coordinates proximal to a current viewpoint of the renderer;

a communication link, through which the memory receives the data blocks from a remote server;

a processor which receives one or more specified coordinates along with indication of a respective resolution level from a renderer, provides the renderer with a first data block which includes data corresponding to the one or more specified coordinates from a local memory, and downloads over the communication link blocks from the resolution level of the first block up to a maximal resolution level of blocks stored on the server that is not above the indicated resolution level which include data corresponding to the one or more coordinates if the first block is not from the indicated level.

14. Apparatus for providing data blocks describing three-dimensional terrain to a render, the data blocks belonging to a hierarchical structure which includes blocks at a plurality of different resolution levels, the apparatus comprising:

a local memory which stores data blocks corresponding to coordinates proximal to a current viewpoint of the renderer;

a communication link, through which the memory receives the data blocks from a remote server;

a processor which receives one or more specified coordinates along with indication of a respective resolution level from a renderer, provides the renderer with a first data block which includes data corresponding to the one or more specified coordinates from a local memory, and downloads over the communication link blocks of lower resolution levels before blocks of higher resolution levels which include data corresponding to the one or coordinates if the first block is not from the indicated level.

15. Apparatus for providing data blocks describing three-dimensional terrain to a render, the data blocks belonging to a hierarchical structure which includes blocks at a plurality of different resolution levels, the apparatus comprising:

a local memory which stores data blocks corresponding to coordinates proximal to a current viewpoint of the renderer;

a communication link, through which the memory receives the data blocks from a remote server;

a processor which receives one or more specified coordinates along with indication of a respective resolution level from a renderer, provides the renderer with a first data block which includes data corresponding to the one or more specified coordinates from a local memory, and downloads over the communication link blocks which include data corresponding to the one or coordinates if the first block is not from the indicated level, wherein the processor downloads blocks of lower resolution levels before blocks of higher resolution levels and the block for which the coordinates were provided last among blocks from a common resolution level is downloaded first.

16. Apparatus for providing data blocks describing three-dimensional terrain to a render, the data blocks belonging to a hierarchical structure which includes blocks at a plurality of different resolution levels, the apparatus comprising:

a local memory which stores data blocks corresponding to coordinates proximal to a current viewpoint of the renderer;

a communication link, through which the memory receives the data blocks from a remote server;

a processor which receives one or more specified coordinates along with indication of a respective resolution level from a renderer, provides the renderer with a first data block which includes data corresponding to the one or more specified coordinates from a local memory, and downloads over the communication link one or more additional blocks according to the order in which the coordinates were provided which include data corresponding to the one or more coordinates if the first block is not from the indicated level.

17. Apparatus according to claim 16, wherein the processor downloads in first precedence the block for which the coordinates were provided last.

18. Apparatus for providing data blocks describing three-dimensional terrain to a render, the data blocks belonging to a hierarchical structure which includes blocks at a plurality of different resolution levels, the apparatus comprising:

a local memory which stores data blocks corresponding to coordinates proximal to a current viewpoint of the renderer;

a communication link, through which the memory receives the data blocks from a remote server;

a processor which receives one or more specified coordinates along with indication of a respective resolution level from a renderer, provides the renderer with a first data block which includes data corresponding to the one or more specified coordinates from a local memory, downloads over the communication link blocks which include data corresponding to the one or coordinates if the first block is not from the indicated level; and downloads excess blocks not currently needed by the renderer to fill up the local memory when the processor is not downloading blocks required by the renderer.

19. Apparatus according to claim 18, wherein the renderer renders a view from a current viewpoint and the processor fills the local memory with substantially all the blocks surrounding a point in the terrain seen from the current viewpoint in a predetermined range.

20. Apparatus according to claim 19, wherein the processor fills the local memory with substantially the same number of blocks from each resolution level.

21. Apparatus according to claim 19, wherein the processor fills the local memory with substantially all the blocks from a lower level before downloading blocks of higher resolution levels.

22. Apparatus according to claim 18, wherein the communication link comprises a connection to the internet.

23. The method of claim 7, wherein the coordinates relate to the coordinates of a predetermined course of a flight vehicle.

24. The apparatus of claim 18, wherein said data blocks relate to a course of a flight vehicle.

* * * * *